US008063930B2

(12) United States Patent
Rotem et al.

(10) Patent No.: US 8,063,930 B2
(45) Date of Patent: Nov. 22, 2011

(54) AUTOMATIC CONVERSION FROM MONOSCOPIC VIDEO TO STEREOSCOPIC VIDEO

(75) Inventors: Efrat Rotem, Haifa (IL); Karni Wolowelsky, D. N. Misgav (IL); David Pelz, Rosh Pina (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 891 days.

(21) Appl. No.: 11/795,158

(22) PCT Filed: Jan. 12, 2006

(86) PCT No.: PCT/IL2006/000047
§ 371 (c)(1),
(2), (4) Date: Mar. 27, 2008

(87) PCT Pub. No.: WO2006/075325
PCT Pub. Date: Jul. 20, 2006

(65) Prior Publication Data
US 2008/0278569 A1    Nov. 13, 2008

(30) Foreign Application Priority Data
Jan. 14, 2005   (IL) .......................... 166305

(51) Int. Cl.
*H04N 15/00*    (2006.01)
*H04N 13/00*    (2006.01)

(52) U.S. Cl. .............. 348/42; 348/25; 348/40; 345/156; 345/419; 345/427; 345/646; 382/154

(58) Field of Classification Search .................. 348/25, 348/40, 42, 43, 44, 45, 46, 47, 48, 49, 50, 348/51
See application file for complete search history.

(56) References Cited

U.S. PATENT DOCUMENTS

| | | | | |
|---|---|---|---|---|
| 5,436,638 A * | 7/1995 | Bolas et al. | ................... | 345/156 |
| 5,510,832 A * | 4/1996 | Garcia | ............................ | 348/56 |
| 6,031,564 A * | 2/2000 | Ma et al. | ......................... | 348/43 |
| 6,215,516 B1 * | 4/2001 | Ma et al. | ......................... | 348/43 |
| 6,477,267 B1 * | 11/2002 | Richards | ....................... | 382/154 |
| 6,496,598 B1 * | 12/2002 | Harman | ........................ | 382/154 |
| 7,180,536 B2 * | 2/2007 | Wolowelsky et al. | .......... | 348/42 |
| 7,573,475 B2 * | 8/2009 | Sullivan et al. | ............... | 345/427 |
| 7,573,489 B2 * | 8/2009 | Davidson et al. | ............ | 345/646 |
| 2004/0212612 A1 * | 10/2004 | Epstein et al. | ................ | 345/419 |

FOREIGN PATENT DOCUMENTS

| | | |
|---|---|---|
| WO | WO 00/39995 | 11/2000 |
| WO | WO03/105491 | 12/2003 |

OTHER PUBLICATIONS

Wu, H.-H.P. et al., "Uncalibrated rectification for stereoscopic image pair based on epipolar geometry," Signal Processing, 2004. Aug. 31, 2004, pp. 881-884, XP010809765 ISBN: 0-7803-8406-7. (Abstract only).
M. Op de Beek et al., "Three Dimensional Video for the Home," Proc. of EUROIMAGE ICAV3D, pp. 188-191, 2001. (Abstract only).
R. Kumar et al., "Direct recovery of shape from multiple views: a parallax based approach," In Proc $12^{th}$ ICPR, pp. 685-688, 1994. (Abstract only).
Irani, M. et al., "A unified approach to moving object detection in 2D and 3D scenes," IEEE Trans. PAMI 20(6), pp. 577-589, Jun. 1998. (Abstract only).
Bergen, J.R. et al., "Hierarchical Model-Based Motion Estimation," ECCV, pp. 237-252, 1992.
Barron, J.L. et al., "Performance of Optical Flow Techniques," IJCV 12:1, pp. 43-77, 1944. (Abstract only).
Arif M et al: "Stratified Approach to 30 Reconstruction", Pakistan Journal of Info. and Technology, vol. 1, No. 2, Jul. 2002, pp. 75-79, XP001246903.
Zhu, et.al., Parallel-Perspective Stereo Mosaics, IEEC International Conference on Computer Vision, Vancouver, Canada, Jul. 2001, vol. 1 pp. 345-352.
R. Hartley, A. Zisserman, "Multiple View Geometry in Computer Vision", Cambridge University Press, 2000.
C.C Salma "Manual of Photogrammetry", American Society of Photogrammetry,1980.

* cited by examiner

*Primary Examiner* — Michael Won
(74) *Attorney, Agent, or Firm* — Ohlandt, Greeley, Ruggiero & Perle, LLP

(57) ABSTRACT

The invention is a method for converting a monoscopic video movie passively acquired using a single camera to a stereoscopic video movie. The method comprises generating stereoscopic pairs comprising, for each frame in the original sequence, a transformed original frame selected from the monoscopic video movie and a transformed alternate frame. The transformed frames are generated from the original and the alternate frame.

8 Claims, No Drawings

AUTOMATIC CONVERSION FROM MONOSCOPIC VIDEO TO STEREOSCOPIC VIDEO

FIELD OF THE INVENTION

The present invention relates to the field of stereoscopic movies. More specifically the invention relates to a method for converting a monoscopic video movie to a stereoscopic video movie.

BACKGROUND OF THE INVENTION

Publications and other reference materials referred to herein, including reference cited therein, are incorporated herein by reference in their entirety. Some are numerically referenced in the following text and respectively grouped in the appended Bibliography which immediately precedes the claims.

Stereoscopic, or three-dimensional, photography is based on the principle of human vision. Two separate detectors (the eyes) detect the same object from slightly different angles and project them onto two planes (the retinas). The resulting images are transferred to a processor (the brain) which combines them and gives the perception of the third dimension, i.e. depth, to the scene.

Since the first practical demonstration of a stereoscope by Wheatstone in 1838, many different methods of creating and displaying stereo images have been developed. Most are hardware based methods such as using two cameras with a fixed relation between them or a single camera with two lenses to photograph a scene and produce the two slightly shifted images needed.

Similarly, many methods of viewing the stereoscopic images have been developed and include the use of colored or polarizing filters to separate the two images, temporal selection by successive transmission of the images using a shutter arrangement, or physical separation of the images in the viewer and projecting them separately to each eye. The last method was, on the one hand, the one originally used by Wheatstone and, on the other hand, employed in the latest virtual reality techniques.

The above mentioned methods of producing and viewing stereoscopic images and are well known in the art and need not be described in further detail herein.

Stereoscopic series of images are, in principle, nothing but a series of stereoscopic images that are viewed in succession. They are usually produced by means of series of images from cameras with two slightly displaced lenses that record pairs of frames of images. Each frame shows the scene at a slightly different angle than its partner. In order to obtain a film in which the viewed action appears to flow continuously and naturally, the utmost stability is required during the photographing process. As a result, to date prior art stereoscopic series of images have been produced only by use of specially designed and stabilized cameras.

Methods of producing a seamless stereo pair of mosaics from a moving video camera have been developed by, for example, Peleg, et. al. [WO 00/39995] and Zhu, et. al. [Parallel-Perspective Stereo Mosaics, IEEC International Conference on Computer Vision, Vancouver, Canada, July 2001, Vol. 1 pp. 345-352]. In order to produce three dimensional effects, according to these methods, matches are performed on the stereo mosaics and not on the individual video frames. These methods essentially take a video film and turn it into a static mosaic. The resulting views are static and don't give the viewer the feeling of motion of the camera that was contained in the original film.

In co-pending Patent Application WO 03/105491 by the same applicant, the description of which, including reference cited therein, is incorporated herein by reference in its entirety is described a process for producing a stereoscopic movie from a sequence of consecutive images of a scene.

With the exception of the method described in the above referenced WO 03/105491, current methods for generating single camera stereoscopic videos and ad-hoc standards are typically based on creating a depth map. The depth map calculation is based on structure from motion methods. In order to work properly the depth map should be very dense and accurate. Otherwise, local deformations may occur.

It is therefore a purpose of the present invention to provide a method of producing a stereoscopic movie from any series of consecutive images of a scene in which does not depend on the calculation of the depth map.

It is another purpose of the present invention to provide a method of overcoming some of the limitations of the method taught in WO 03/105491 by transforming both of the frames from which the stereo pair is constructed.

Further purposes and advantages of this invention will appear as the description proceeds.

SUMMARY OF THE INVENTION

In a first aspect, the invention is a method for converting a monoscopic video movie passively acquired using a single camera to a stereoscopic video movie. The method comprises generating, for each frame in the original sequence, stereoscopic pairs comprised of a transformed original frame selected from the monoscopic video movie and a transformed alternate frame. The transformed frames are generated from an original frame and an alternate frame in the monoscopic video movie by the following steps:

a.) select the original frame;
b.) select the alternate frame such that a considerable, approximately constant parallax is developed between it and the original frame;
c.) calculate the fundamental matrix between the original frame and the alternate frame based on point correspondences between them;
d.) calculate from the fundamental matrix two homography transformations that may stratified the original and the alternate frames;
e.) apply one of the homography transformations to the original frame and the other of the homography transformations to the alternate frame, thereby obtaining two new frames, which are stereoscopic partners.

In step b), the same parallax is used for selecting the alternate frames for each of the frames in the sequence.

In steps c) and d) the fundamental matrix may be replaced by any other matrix that is capable of estimating the relative position of the two cameras that produced the pair of images.

Additional information may be used for calculating the relative camera states. The additional information may be used either together with the automatic calculation of the correspondences between frames or instead of the automatic calculation of the correspondences between frames. The additional information may be from a navigation system such as GPS information.

The method of the invention may be carried out using a PC based real time system. The point correspondences between the original and the alternate frames can be created using an automatic process based on a known correspondence algorithm selected from either optical flow or feature based registration.

In another aspect, the invention is a stereoscopic video movie created from a monoscopic video movie using the above method. The sequence of the images in the monoscopic video movie is preserved in the sequence of stereo pairs in the stereoscopic video movie.

All the above and other characteristics and advantages of the invention will be further understood through the following illustrative and non-limitative description of preferred embodiments thereof.

DETAILED DESCRIPTION OF PREFERRED EMBODIMENTS

The method of the invention is based on passively acquired video images using a single camera and may be applied in a PC based real time system. The original video movie to be converted is captured by a moving camera. As such, effects of rotating, fluctuation, approaching, distancing etc. may occur between adjacent frames. In order to get the stereoscopic perception, it is assumed that for every frame in the video sequence (base frame) there is another frame (alternate frame) such that sufficient parallax was developed between them. The parallax is generally created as a result of the camera movement. The original and alternate frames are the raw material for the stereoscopic pair that replaces the original frame in the stereoscopic video sequence.

In order to create a stereoscopic pair from two frames of a sequence it is necessary to understand the binocular depth cues. In [7] two depth cues are described. They are the convergence angles of the optical axes of the eyes, and retinal disparity. The convergence muscles rotate the eyes such that their optical axes intersect at a point in the scene (point P). The sensing of the amount of muscular tension resulting from different convergence angles provides a cue to the absolute distance to that point. The retinal disparity cue can be explained by using the concept of corresponding retinal points in the two eyes. If an observed point A falls at the same place on the retina of the composite eye, then it will be observed as being at the same distance as the point P. Otherwise the disparity between the images of point A at the eyes, is interpreted as a change in distance of point A relative to the distance of point P. In case of a large retinal disparity objects may appear as two entities. In developing a stereoscopic system which is an analogue to binocular vision, it is possible to provide true convergence accommodation and retinal disparity. But it is also possible to create effects such as vertical exaggeration by increasing the base between the two cameras. Vertical exaggeration does not create deformation and might be an advantage in scene understanding.

Therefore, obtaining a stereoscopic vision out of two frames that are different in angle, scale, skew, etc. requires a transformation process. Since the convergence muscles operate horizontally, and the retinal disparity should be small, it is impossible to take the original and alternate frames to each eye directly.

The disparity between the displayed images should be especially horizontal to allow correspondence by the vision system. In [4] a process for stratified reconstruction is presented. The process receives as input two images and the point correspondences and creates two stratified images using the fundamental matrix theory. As a result the disparities in the transformed images are horizontal. A disadvantage is that if the original frame is transformed, as it is in [4], the stereoscopic video movie will not be displayed from the same point of view as the original video.

The solution provided by the present invention is based on [4]. A fundamental matrix between the original and alternate frames is calculated based on point correspondences between them. The fundamental matrix represents the relative camera's parameters when capturing the base and alternate frames, induced by the camera movement. The parameters consist of relative position, angles (extrinsic parameters) and the cameras' intrinsic parameters such as FOV. The fundamental matrix is used to calculate two homographic transformations. Two new frames, which are stereoscopic partners, result from applying these transformations on the original and alternate frames. As a result all the scene points which belong to the average plane are projected to the same pixel index in both frames, the original and its stereoscopic pair. Other scene points are projected to different pixel indices. The residual disparities in horizontal and vertical directions should be in retinal disparity capabilities. The criterion to choose the alternate frame from the sequence is based on the desired extent of stereoscopic effect and on retinal disparity limitations.

As mentioned above the fundamental matrix represents the relative state of camera when capturing the original and alternate frames. There are other matrixes which may be used in special cases such as the essential matrix [4]. The step of calculating the relative camera states may also carried out using additional information, e.g. GPS when available for example from a navigation system. The additional information may be used together with the automatic calculation of the correspondences between frames or might replace it if the additional information is complete and accurate.

Creating point correspondences between frames is an automatic process based on known correspondence algorithms such as optical flow [8] or feature based registration [6]. Therefore the conversion process is automatic.

The basis of the method of the invention is described in WO 03/105491. The innovation in the present invention is the theoretical concept that the stereoscopic pair may be created by transforming each image, base and alternate, by suitable perspective transformations. The transformations may be derived using the fundamental matrix theory. The stereoscopic video created by the method described in WO 03/105491 emphasizes the structure of objects relative to an average plane in the scene. The method of the present invention emphasizes the distance between the viewer and the scene. The process of video conversion may use either method depending on the application field. For example, in an application such as remote sensing using a flying camera it is usually important to understand the objects' structure so the first method would be preferred over the method of the present invention. In applications in which it is desired to know the relative distance to or between objects in the scene, the method of the present invention is preferred.

Furthermore, by applying suitable homographic transformations according to the present invention, it is possible to overcome some of the limitations of the method taught in WO 03/105491. Specifically:

a) When the main movement of the camera is vertical (in the camera plane) it is almost impossible to get horizontal parallax as required by WO 03/105491. Applying homographic transformations to both frames (e.g. rotation by 90 degrees) enables one to obtain the stereoscopic pair.

b) In the method of the present invention, when the relative state of camera/fundamental matrix is known there are infinite solutions of pairs of homographic transformations that may be applied to the frames. Therefore there is provided the flexibility to choose the amount of stereoscopic exaggeration and get other stereoscopic effects by choosing the appropriate homographic transformations.

c) If the camera move exactly horizontally, but it is desired to imitate the convergence angle of the optical axes of the eyes, it is possible to obtain that effect only by applying the suitable homographic transformations to both the original and the alternate frames.

Although embodiments of the invention have been described by way of illustration, it will be understood that the invention may be carried out with many variations, modifications, and adaptations, without departing from its spirit or exceeding the scope of the claims.

BIBLIOGRAPHY

[1] M. Op de Beek, A. Redert, "Three dimensional video for the home", Proc. of EUROIMAGE ICAV3D, pp. 188-191, 2001.
[2] P. Harman, J. Flack, S. Fox, M. Dowley, "Rapid 2D to 3D Conversion", Proc. of Stereoscopic Displays and Virtual Reality Systems IX, SPIE, vol. 4669, pp. 78-86.
[3] R. Kumar, P. Anandan, K. Hanna, "Direct recovery of shape from multiple views: a parallax based approach." In Proc 12th ICPR, pp. 685-688, 1994.
[4] R. Hartley, A. Zisserman, "Multiple View Geometry in Computer Vision", Cambridge University Press, 2000.
[5] M. Irani, P. Anandan, "A unified Approach to Moving Object Detection in 2D and 3D Scenes", IEEE Trans. PAMI 20(6), pp. 577-589, June 1998.
[6] J. R. Bergen, P. Anandan, K. Hanna, R. Hingorani, "Hiearchical model-based motion estimation", ECCV, pp. 237-252, 1992.
[7] C. C. Salma "Manual of Photogrammetry", American Society of Photogrammetry, 1980.
[8] J. L Barrob, D. J. Fleet, S. S. Beauchemin, "Performance of Optical Flow Techniques", IJCV 12:1, pp. 43-77, 1944.

The invention claimed is:

1. A method for converting a monoscopic video movie passively acquired using a single camera to a stereoscopic video movie, said method comprising generating stereoscopic pairs comprising, for each frame in the original sequence, a transformed original frame selected from said monoscopic video movie and a transformed alternate frame; wherein said transformed frames are generated from said original and said alternate frame in said monoscopic video movie by the following steps:
 a.) select said original frame;
 b.) select said alternate frame such that a considerable, approximately constant parallax is developed between it and said original frame;
 c.) calculate the fundamental matrix between said original frame and said alternate frame based on point correspondences between them;
 d.) calculate from said fundamental matrix two homography transformations that may stratify said original and said alternate frames;
 e.) apply one of said homography transformations to said original frame and the other of said homography transformations to said alternate frame, thereby obtaining two new frames, which are stereoscopic partners.

2. A method according to claim 1, wherein said method is carried out using a PC based real time system.

3. A method according to claim 1, wherein the point correspondences between the original and the alternate frames are created using an automatic process based on a known correspondence algorithm.

4. A method according to claim 3, wherein the known correspondence algorithm is selected from the group comprising:
 a.) optical flow; and
 b.) feature based registration.

5. A method according to claim 1, wherein additional information may be used to calculate the relative camera's states in steps c) and d) either:
 a.) together with the use of the fundamental matrix or
 b.) instead of use of the fundamental matrix.

6. A method according to claim 5, wherein the additional information is GPS information or other information from a navigational system.

7. A method according to claim 1, wherein in steps c) and d) the fundamental matrix is replaced by any other matrix that is capable of estimating the relative position of the two cameras that produced the pair of images.

8. A stereoscopic video movie created from a monoscopic video movie using the method of claim 1, wherein the sequence of the images in said monoscopic video movie is preserved in the sequence of stereo pairs in said stereoscopic video movie.

* * * * *